United States Patent
Avery et al.

(10) Patent No.: US 11,295,070 B2
(45) Date of Patent: *Apr. 5, 2022

(54) PROCESS-LEVEL METADATA INFERENCE AND MAPPING FROM DOCUMENT ANNOTATIONS

(71) Applicant: International Business Machines Corporation, Armonk, NY (US)

(72) Inventors: Kenytt D. Avery, Newport Beach, CA (US); Edward L. Bader, Los Angeles, CA (US); Patricia V. Gatewood, Costa Mesa, CA (US); Kevin N. Trinh, Garden Grove, CA (US)

(73) Assignee: International Business Machines Corporation, Armonk, NY (US)

( * ) Notice: Subject to any disclaimer, the term of this patent is extended or adjusted under 35 U.S.C. 154(b) by 428 days.

This patent is subject to a terminal disclaimer.

(21) Appl. No.: 14/723,751

(22) Filed: May 28, 2015

(65) Prior Publication Data

US 2016/0048574 A1    Feb. 18, 2016

Related U.S. Application Data

(63) Continuation of application No. 14/460,238, filed on Aug. 14, 2014.

(51) Int. Cl.
| | | |
|---|---|---|
| *G06F 17/30* | (2006.01) | |
| *G06F 40/169* | (2020.01) | |
| *G06F 16/22* | (2019.01) | |
| *G06F 16/23* | (2019.01) | |
| *G06Q 10/06* | (2012.01) | |

(52) U.S. Cl.
CPC ........ *G06F 40/169* (2020.01); *G06F 16/2291* (2019.01); *G06F 16/2358* (2019.01); *G06Q 10/06* (2013.01)

(58) Field of Classification Search
CPC ............. G06F 17/30855; G06F 40/169; G06F 16/2291; G06F 16/2358; G06Q 10/06
See application file for complete search history.

(56) References Cited

U.S. PATENT DOCUMENTS

| | | |
|---|---|---|
| 6,721,921 B1 | 4/2004 | Altman |
| 7,472,341 B2 | 12/2008 | Albornoz et al. |

(Continued)

OTHER PUBLICATIONS

United States Patent and Trademark Office, Advisory Action for U.S. Appl. No. 13/963,555, dated Jan. 5, 2018, pp. 1-10, Alexandria, VA, USA.

(Continued)

*Primary Examiner* — Huawen A Peng
(74) *Attorney, Agent, or Firm* — Konrad Raynes Davda & Victor LLP; Janaki K. Davda

(57) ABSTRACT

A user annotation entered in association with a content document of a workflow process executed in association with a metadata context-driven processing system is detected. The user annotation entered in association with the content document is analyzed according to a process-level context associated with the content document within the workflow process. Process-level metadata of the workflow process is inferred based upon the analysis of the user annotation according to the process-level context. The inferred process-level metadata is stored as part of the process-level context of the workflow process.

8 Claims, 5 Drawing Sheets

(56) References Cited

U.S. PATENT DOCUMENTS

| | | | |
|---|---|---|---|
| 7,475,335 B2 | 1/2009 | Krishna et al. | |
| 7,478,332 B2 | 1/2009 | Buttner et al. | |
| 7,506,246 B2 * | 3/2009 | Hollander | G06F 40/169 |
| | | | 715/230 |
| 7,555,705 B2 | 6/2009 | Chen et al. | |
| 7,765,192 B2 | 7/2010 | Svendsen | |
| 7,818,300 B1 | 10/2010 | Kilday et al. | |
| 7,836,390 B2 * | 11/2010 | Lin | G06F 40/169 |
| | | | 715/230 |
| 7,870,152 B2 | 1/2011 | Cragun et al. | |
| 7,962,846 B2 | 6/2011 | Lerner et al. | |
| 7,962,847 B2 | 6/2011 | Malkin et al. | |
| 8,015,482 B2 | 9/2011 | Simova et al. | |
| 8,229,897 B2 | 7/2012 | Cannon et al. | |
| 8,364,020 B2 * | 1/2013 | Lui | G06F 40/169 |
| | | | 386/278 |
| 8,850,516 B1 | 9/2014 | Hrebicek et al. | |
| 9,262,390 B2 | 2/2016 | Edala et al. | |
| 9,678,949 B2 * | 6/2017 | Monk, II | G06F 40/30 |
| 9,704,115 B2 | 7/2017 | Johnson et al. | |
| 9,842,095 B2 | 12/2017 | Kumar et al. | |
| 10,083,160 B1 * | 9/2018 | Yu | G06F 3/0483 |
| 10,380,233 B2 | 8/2019 | Avery et al. | |
| 10,380,234 B2 | 8/2019 | Avery et al. | |
| 2004/0163042 A1 * | 8/2004 | Altman | G06F 17/30722 |
| | | | 715/233 |
| 2004/0181544 A1 * | 9/2004 | Anderson | G06F 16/288 |
| 2004/0261016 A1 * | 12/2004 | Glass | H04L 51/12 |
| | | | 715/230 |
| 2005/0210038 A1 | 9/2005 | Dettinger et al. | |
| 2006/0259468 A1 | 11/2006 | Brooks et al. | |
| 2006/0282762 A1 | 12/2006 | Diamond et al. | |
| 2007/0118794 A1 | 5/2007 | Hollander et al. | |
| 2007/0136397 A1 | 6/2007 | Pragada et al. | |
| 2007/0174247 A1 * | 7/2007 | Xu | G06F 16/38 |
| 2008/0066048 A1 | 3/2008 | Hafermann et al. | |
| 2008/0162530 A1 * | 7/2008 | van Eikeren | G06F 40/143 |
| 2008/0172293 A1 | 7/2008 | Raskin et al. | |
| 2008/0178198 A1 | 7/2008 | Gauba | |
| 2008/0195931 A1 * | 8/2008 | Raghupathy | G06K 9/00402 |
| | | | 715/230 |
| 2009/0125597 A1 | 5/2009 | Carr et al. | |
| 2009/0177721 A1 | 7/2009 | Mimatsu | |
| 2009/0235155 A1 | 9/2009 | Ueda | |
| 2009/0249446 A1 | 10/2009 | Jenkins et al. | |
| 2009/0300064 A1 | 12/2009 | Dettinger et al. | |
| 2009/0300471 A1 | 12/2009 | Dettinger et al. | |
| 2009/0300705 A1 | 12/2009 | Dettinger et al. | |
| 2010/0057769 A1 | 3/2010 | Lippert et al. | |
| 2010/0115393 A1 | 5/2010 | Albornoz et al. | |
| 2010/0153835 A1 | 6/2010 | Xiong et al. | |
| 2010/0218082 A1 | 8/2010 | Charfi | |
| 2010/0223261 A1 * | 9/2010 | Sarkar | G06F 16/38 |
| | | | 707/726 |
| 2010/0228693 A1 * | 9/2010 | Dawson | G06F 16/322 |
| | | | 706/12 |
| 2011/0023007 A1 * | 1/2011 | Chumbley | G06F 8/71 |
| | | | 717/102 |
| 2011/0078169 A1 | 3/2011 | Sit | |
| 2011/0167331 A1 | 7/2011 | Altman | |
| 2011/0179001 A1 * | 7/2011 | Lindsley | G06F 16/435 |
| | | | 707/705 |
| 2011/0320935 A1 | 12/2011 | Piersol et al. | |
| 2012/0030256 A1 | 2/2012 | Pfeifer et al. | |
| 2012/0060082 A1 | 3/2012 | Edala et al. | |
| 2012/0231441 A1 * | 9/2012 | Parthasarathy | G09B 7/02 |
| | | | 434/362 |
| 2012/0233150 A1 * | 9/2012 | Naim | G06F 40/169 |
| | | | 707/722 |
| 2012/0259746 A1 | 10/2012 | Groom et al. | |
| 2012/0265744 A1 * | 10/2012 | Berkowitz | G06Q 30/0613 |
| | | | 707/705 |
| 2012/0272160 A1 * | 10/2012 | Spivack | H04L 51/32 |
| | | | 715/752 |
| 2013/0144878 A1 | 6/2013 | James et al. | |
| 2013/0159938 A1 * | 6/2013 | James | G06F 3/017 |
| | | | 715/863 |
| 2014/0006919 A1 * | 1/2014 | He | G06F 40/169 |
| | | | 715/230 |
| 2014/0012614 A1 | 1/2014 | Beresford-Wood et al. | |
| 2014/0033014 A1 | 1/2014 | Avery et al. | |
| 2014/0033211 A1 * | 1/2014 | Avery | G06Q 10/0633 |
| | | | 718/102 |
| 2014/0358868 A1 | 12/2014 | Costecalde et al. | |
| 2014/0358970 A1 * | 12/2014 | Morris | G06F 9/445 |
| | | | 707/772 |
| 2015/0339370 A1 * | 11/2015 | Onusko | G06F 17/30595 |
| | | | 707/722 |
| 2016/0048563 A1 | 2/2016 | Avery et al. | |
| 2017/0329752 A1 | 11/2017 | Kumar et al. | |
| 2019/0340228 A1 | 11/2019 | Avery et al. | |

OTHER PUBLICATIONS

United States Patent and Trademark Office, Office Action for U.S. Appl. No. 13/558,755, dated Oct. 4, 2017, pp. 1-17, Alexandria, VA, USA.

United States Patent and Trademark Office, Office Action for U.S. Appl. No. 13/963,555, dated Oct. 18, 2017, pp. 1-25 Alexandria, VA, USA.

United States Patent and Trademark Office, Advisory Action for U.S. Appl. No. 13/558,755, dated Aug. 9, 2017, pp. 1-10, Alexandria, VA, USA.

United States Patent and Trademark Office, Advisory Action for U.S. Appl. No. 14/460,238, dated Mar. 1, 2019, pp. 1-12, Alexandria, VA, USA.

United States Patent and Trademark Office, Notice of Allowance for U.S. Appl. No. 13/558,755, dated Nov. 1, 2018, pp. 1-13, Alexandria, VA, USA.

United States Patent and Trademark Office, Notice of Allowance for U.S. Appl. No. 13/963,555, dated Nov. 6, 2018, pp. 1-13, Alexandria, VA, USA.

United States Patent and Trademark Office, PTAB Decision on Appeal for U.S. Appl. No. 13/909,236, filed Jul. 24, 2018, pp. 1-21, Alexandria, VA, USA.

United States Patent and Trademark Office, Office Action for U.S. Appl. No. 13/909,236, dated Oct. 21, 2016, pp. 1-33, Alexandria, VA, USA.

United States Patent and Trademark Office, Office Action for U.S. Appl. No. 14/460,238, dated Oct. 13, 2016, pp. 1-34, Alexandria, VA, USA.

United States Patent and Trademark Office, Examiner's Answer for U.S. Appl. No. 13/909,236, dated Jun. 2, 2017, pp. 1-30, Alexandria, VA, USA.

United States Patent and Trademark Office, Office Action for U.S. Appl. No. 14/460,238, dated May 31, 2017, pp. 1-22, Alexandria, VA, USA.

United States Patent and Trademark Office, Office Action for U.S. Appl. No. 13/558,755, dated Sep. 15, 2016, pp. 1-14, Alexandria, VA, USA.

United States Patent and Trademark Office, Advisory Action for U.S. Appl. No. 13/963,555, dated Sep. 15, 2016, pp. 1-7, Alexandria, VA, USA.

United States Patent and Trademark Office, Office Action for U.S. Appl. No. 13/909,236, dated Nov. 26, 2018, pp. 1-46, Alexandria, VA, USA.

United States Patent and Trademark Office, Office Action for U.S. Appl. No. 13/558,755, dated Jun. 16, 2016, pp. 1-10, Alexandria, VA, USA.

United States Patent and Trademark Office, Office Action for U.S. Appl. No. 13/963,555, dated Jun. 15, 2016, pp. 1-10, Alexandria, VA, USA.

United States Patent and Trademark Office, Office Action for U.S. Appl. No. 13/963,555, dated Apr. 6, 2017, pp. 1-22, Alexandria, VA, USA.

(56) References Cited

OTHER PUBLICATIONS

United States Patent and Trademark Office, Office Action for U.S. Appl. No. 13/558,755, dated May 4, 2017, pp. 1-26, Alexandria, VA, USA.
United States Patent and Trademark Office, Office Action for U.S. Appl. No. 14/460,238, dated Dec. 12, 2018, pp. 1-22, Alexandria, VA, USA.
United States Patent and Trademark Office, Office Action for U.S. Appl. No. 13/558,755, dated Mar. 28, 2016, pp. 1-13, Alexandria, VA, USA.
United States Patent and Trademark Office, Office Action for U.S. Appl. No. 13/963,555, dated Mar. 11, 2016, pp. 1-30, Alexandria, VA, USA.
United States Patent and Trademark Office, Office Action for U.S. Appl. No. 13/909,236, dated Jul. 22, 2015, pp. 1-25, Alexandria, VA, USA.
United States Patent and Trademark Office, Office Action for U.S. Appl. No. 13/909,236, dated Dec. 24, 2015, pp. 1-16, Alexandria, VA, USA.
United States Patent and Trademark Office, Office Action for U.S. Appl. No. 13/909,236, dated May 5, 2016, pp. 1-22, Alexandria, VA, USA.
Kerry Hinge, et al., Process SEER: A Tool for Semantic Effect Annotation of Business Process Models, Proceedings of the IEEE International Enterprise Distributed Object Computing Conference, Sep. 1-4, 2009, pp. 54-63, IEEE Computer Society, Washington, DC.
Yang Liu, et al., A Framework for Semantic Web Services Annotation and Discovery Based on Ontology, Proceedings of the IEEE International Conference on Progress in Informatics and Computing, Dec. 10-12, 2010, pp. 1034-1039, IEEE Computer Society, Washington, DC.
Author Unknown, CreativeSafe—Annotations, Webpage/site, Jun. 23, 2012, pp. 1-5, Williams & Partners, Inc., Published online at: https://web.archive.org/web/20120623200423/http://williamsonline.com/annotations.php.y.
United States Patent and Trademark Office, Office Action for U.S. Appl. No. 13/558,755, dated Oct. 6, 2014, pp. 1-19, Alexandria, VA, USA.
United States Patent and Trademark Office, Office Action for U.S. Appl. No. 13/558,755, dated May 7, 2015, pp. 1-16, Alexandria, VA, USA.
IBM, List of IBM Patents or Patent Applications Treated as Related, Applicant Appendix, May 28, 2015, pp. 1-2, the contents of which are incorporated herein by reference in their entirety.
United States Patent and Trademark Office, Office Action for U.S. Appl. No. 13/909,236, dated May 8, 2019, pp. 1-22, Alexandria, VA, USA.
United States Patent and Trademark Office, Notice of Allowance for U.S. Appl. No. 13/558,755, dated Apr. 17, 2019, pp. 1-19, Alexandria, VA, USA.
United States Patent and Trademark Office, Notice of Allowance for U.S. Appl. No. 13/963,555, dated Apr. 8, 2019, pp. 1-19, Alexandria, VA, USA.
United States Patent and Trademark Office, Advisory Action for U.S. Appl. No. 13/909,236, dated Jan. 5, 2017, pp. 1-10, Alexandria, VA, USA.
United States Patent and Trademark Office, Notice of Allowance for U.S. Appl. No. 13/909,236, dated Jul. 18, 2019, pp. 1-13, Alexandria, VA, USA.
IBM, List of IBM Patents or Patent Applications Treated as Related, Applicant Appendix, Jul. 26, 2019, pp. 1-2, the contents of which are incorporated herein by reference in their entirety.
Preliminary Amendment for U.S. Appl. No. 14/460,238, 7 pp., dated May 28, 2015. [57.483 (PrelimAmend)].
Response to Office Action 1 for U.S. Appl. No. 14/460,238, 16 pp., dated Jan. 12, 2017. [57.483 (ROA1)].
Response to Final Office Action 1 for U.S. Appl. No. 14/460,238, 18 pp., dated Aug. 30, 2017. [57.483 (RFOA1)].
Response to Office Action 3 for U.S. Appl. No. 14/460,238, 19 pp., dated Jul. 4, 2018. [57.483 (ROA3)].
Response to Final Office Action 2 for U.S. Appl. No. 14/460,238, 18 pp., dated Feb. 5, 2019. [57.483 (RFOA2)].
Pre-Appeal Brief Request for Review for U.S. Appl. No. 14/460,238, 5 pp., filed Mar. 11, 2019. [57.483 (PreAppealConfReq)].
Notice of Panel Decision from Pre-Appeal Brief Review for U.S. Appl. No. 14/460,238, 2 pp., filed Apr. 9, 2019. [57.483 (PanelDec)].
Appeal Brief for U.S. Appl. No. 14/460,238, 72 pp., filed May 13, 2019. [57.483 (AppealBrief)].
Office Action 5 for U.S. Appl. No. 14/460,238, 24 pp., dated Oct. 18, 2019. [57.483 (OA5)].
Response to Office Action 5 for U.S. Appl. No. 14/460,238, 15 pp., dated Feb. 18, 2020. [57.483 (ROA5)].
Response to Office Action 1 for U.S. Appl. No. 13/558,755, 17 pp., dated Jan. 6, 2015. [57.478 (ROA1)].
Response to Final Office Action 1 for U.S. Appl. No. 13/558,755, 18 pp., dated Aug. 6, 2015. [57.478 (RFOA1)].
Response to Office Action 3 for U.S. Appl. No. 13/558,755, 10 pp., dated May 30, 2016. [57.478 (ROA3)].
Response to Final Office Action 2 for U.S. Appl. No. 13/558,755, 11 pp., dated Aug. 15, 2016. [57.478 (RFOA2)].
Response to Office Action 5 for U.S. Appl. No. 13/558,755, 18 pp., dated Dec. 15, 2016. [57.478 (ROA5)].
Response to Final Office Action 3 for U.S. Appl. No. 13/558,755, 17 pp., dated Jul. 5, 2017. [57.478 (RFOA3)].
Second Response to Final Office Action 3 for U.S. Appl. No. 13/558,755, 18 pp., dated Aug. 9, 2017. [57.478 (RFOA3-2)].
Response to Office Action 7 for U.S. Appl. No. 13/558,755, 16 pp., dated Jan. 2, 2018. [57.478 (ROA7)].
Response to Office Action 8 for U.S. Appl. No. 13/558,755, 12 pp., dated Jul. 18, 2018. [57.478 (ROA8)].
Response to Office Action 1 for U.S. Appl. No. 13/963,555, 12 pp., dated May 30, 2016. [57.478C1 (ROA1)].
Response to Final Office Action 1 for U.S. Appl. No. 13/963,555, 5 pp., dated Aug. 15, 2016. [57.478C1 (RFOA1)].
Second Response to Final Office Action 1 for U.S. Appl. No. 13/963,555, 6 pp., dated Sep. 15, 2016. [57.478C1 (RFOA1-2)].
Response to Office Action 3 for U.S. Appl. No. 13/963,555, 10 pp., dated Jul. 6, 2017. [57.478C1 (ROA3)].
Response to Final Office Action 2 for U.S. Appl. No. 13/963,555, 13 pp., dated Dec. 18, 2017. [57.478C1 (RFOA2)].
Second Response to Final Office Action 2 for U.S. Appl. No. 13/963,555, 14 pp., dated Jan. 16, 2018. [57.478C1 (RFOA2-2)].
Response to Office Action 5 for U.S. Appl. No. 13/963,555, 9 pp., dated Jul. 9, 2018. [57.478C1 (ROA5)].
Response to Office Action 1 for U.S. Appl. No. 13/909,236, 21 pp., dated Oct. 21, 2015.
Response to Final Office Action 1 for U.S. Appl. No. 13/909,236, 24 pp., dated Mar. 18, 2016.
Response to Office Action 3 for U.S. Appl. No. 13/909,236, 24 pp., dated Aug. 5, 2016.
Response to Final Office Action 2 for U.S. Appl. No. 13/909,236, 28 pp., dated Dec. 20, 2016.
Appeal Brief for U.S. Appl. No. 13/909,236, 55 pp., dated Mar. 20, 2017.
Response to Office Action 5 for U.S. Appl. No. 13/909,236, 17 pp., dated Feb. 26, 2019.
Response to Final Office Action 3 for U.S. Appl. No. 13/909,236, 11 pp., dated Jul. 8, 2019.
Office Action 1 for U.S. Appl. No. 16/517,496, 29 pp, dated Sep. 17, 2020. [57.478C2 (OA1)].
Response to Office Action 1 for U.S. Appl. No. 16/517,496, 7 pp, dated Oct. 6, 2020. [57.478C2 (ROA1)].
Final Office Action 3 for U.S. Appl. No. 14/460,238, 27 pp., dated Apr. 20, 2020. [57.483 (FOA3)].
Response to Final Office Action 3 for U.S. Appl. No. 14/460,238, 15 pp., dated Jul. 24, 2020. [57.483 (RFOA3)].
Notice of Allowance 1 for U.S. Appl. No. 16/517,496, 7 pp, dated Oct. 30, 2020. [57.478C2 (NOA1)].
Notice of Allowance 2 for U.S. Appl. No. 14/460,238, 10 pp., dated Aug. 23, 2021. [57.483 (NOA2)].

(56) References Cited

OTHER PUBLICATIONS

United States Patent and Trademark Office, Office Action for U.S. Appl. No. 13/558,755, dated Apr. 19, 2018, pp. 1-20, Alexandria, VA, USA.
United States Patent and Trademark Office, Office Action for U.S. Appl. No. 13/963,555, dated Apr. 9, 2018, pp. 1-11, Alexandria, VA, USA.
United States Patent and Trademark Office, Office Action for U.S. Appl. No. 14/460,238, dated Apr. 4, 2018, pp. 1-34, Alexandria, VA, USA.
Notice of Allowance for U.S. Appl. No. 14/460,238, 14 pp., dated Jul. 7, 2021. [57.483 (NOA)].
Notice of Allowance for U.S. Appl. No. 14/460,238, 11 pp., dated Oct. 18, 2021.

* cited by examiner

PROCESS-LEVEL METADATA INFERENCE AND MAPPING FROM DOCUMENT ANNOTATIONS

BACKGROUND

The present invention relates to document annotation processing. More particularly, the present invention relates to process-level metadata inference and mapping from document annotations.

Documents may be used to compartmentalize content in association with workflow and other processes. Documents may be modified during a given phase of a workflow process by a person designated to evaluate and update the content in association with duties related to that phase of the workflow process. The updated content may be stored for use in subsequent phases of a workflow process, and the content may be further modified during one or more subsequent phases of the workflow process. As such, the documents capture and represent the resulting work product of the workflow process.

BRIEF SUMMARY

A method includes detecting, by a processor, a user annotation entered in association with a content document of a workflow process executed in association with a metadata context-driven processing system; analyzing the user annotation entered in association with the content document according to a process-level context associated with the content document within the workflow process; inferring process-level metadata of the workflow process based upon the analysis of the user annotation according to the process-level context; and storing the inferred process-level metadata as part of the process-level context of the workflow process.

A system includes a memory; and a processor programmed to: detect a user annotation entered in association with a content document of a workflow process executed in association with a metadata context-driven processing system; analyze the user annotation entered in association with the content document according to a process-level context associated with the content document within the workflow process; infer process-level metadata of the workflow process based upon the analysis of the user annotation according to the process-level context; and store the inferred process-level metadata within the memory as part of the process-level context of the workflow process.

A computer program product includes a computer readable storage medium having computer readable program code embodied therewith, where the computer readable program code when executed on a computer causes the computer to: detect a user annotation entered in association with a content document of a workflow process executed in association with a metadata context-driven processing system; analyze the user annotation entered in association with the content document according to a process-level context associated with the content document within the workflow process; infer process-level metadata of the workflow process based upon the analysis of the user annotation according to the process-level context; and store the inferred process-level metadata as part of the process-level context of the workflow process.

DETAILED DESCRIPTION

Figure 1:
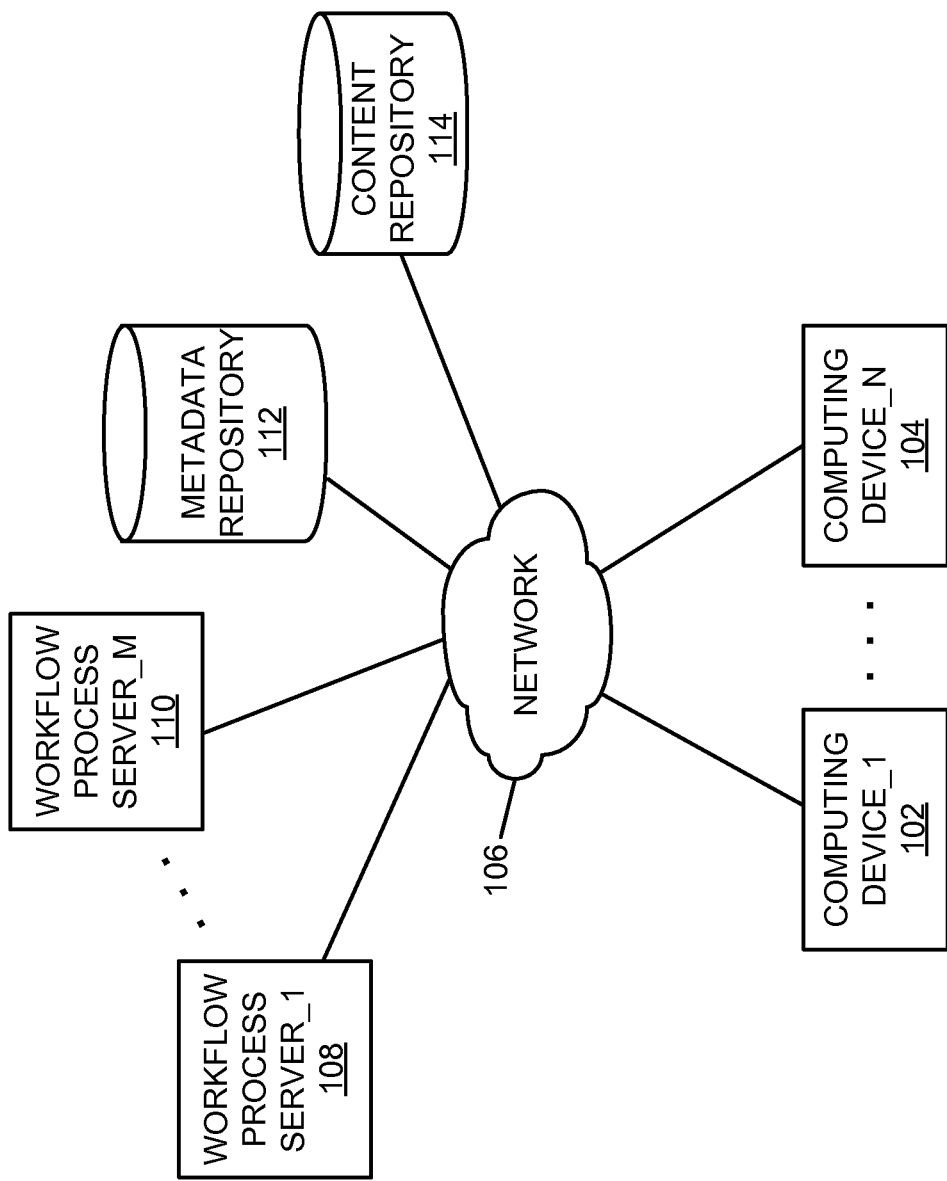
FIG. 1 is a block diagram of an example of an implementation of a system for process-level metadata inference and mapping from document annotations according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides process-level metadata inference and mapping from document annotations. The present technology introduces a process-level metadata inference component that operates to detect an act of a user annotating a document (e.g., content associated with a workflow process). The process-level metadata inference component infers process-level metadata from the detected annotations, maps the inferred process-level metadata to process-level objects, and initiates process-level operations in response to the changes in process-level metadata. As such, the present subject matter provides an autonomous technological bridge between user annotations entered in association with documents and process-level metadata that is programmatically inferred from the user annotations.

The programmatically-inferred process-level metadata may be associated with process-level objects that are distinct from the documents/content with which the user annotations are originally entered and associated. The user annotations on the documents remain intact, and process-level functionality may autonomously proceed to or invoke one or more subsequent phases of workflow processing. The subsequent phase(s) of the process-level functionality may utilize the original unaltered user document annotations to further facilitate and guide the processing of the respective subsequent phase(s) of the process-level functionality and to allow users involved in the subsequent phase(s) of the workflow process to view the original annotations. By providing integrated process-level inference technology in combination with usability of original document/content annotations, the inferred process-level metadata enhances process-level context and programmatic decision making related to process-level functionality, while maintaining experiential human factor aspects related to workflow process interaction by workflow participants.

The present technology provides inference and mapping of a wide variety of document annotations to process-level metadata properties for one or more process-level objects. Annotations entered in association with an individual document may be individually analyzed or analyzed as a set, and process-level metadata properties associated with the document's container object may be inferred from the document annotations. For example, metadata for a case or case folder that contains a document image (e.g., an x-ray, insurance application, etc.) may be inferred from annotations entered on an image of the document.

By leveraging programmatic inference of process-level metadata from document annotations, process-level metadata entry may be made consistent across multiple process-level entities (e.g., across multiple cases, multiple claims, etc.). Further, process-level metadata entry errors may be reduced, efficiency of process-level activities may be improved, and duplication of information may be reduced. As such, the present technology may be leveraged to increase productivity of workflow participants and to replicate quality/consistency of process-level outcomes, and as a result may also reduce time requirements and costs associated with workflow process-level activities.

Document and image-based annotations may be processed and analyzed using image recognition technologies, such as optical character recognition (OCR), and handwriting recognition technology to capture the content of the respective annotations. The captured annotation content may then be analyzed to determine how the captured annotation content relates to process-level activities. The relationship between the captured annotation content as it relates to process-level activities may be documented in the form of a change to process-level metadata of a process-level object associated with the annotated document. Workflow process-level activity may be invoked to further process the changed process-level metadata, such as performing an additional action related to processing within the respective workflow/process, including further processing of the annotated document/image itself as appropriate for the given implementation.

For example, where a case management system is used to process loan applications, a scanned loan application document attached to a loan request case/folder may have programmatically-captured hand-written or otherwise notated annotations on or associated with the document. The annotations may include requests for additional employment history, income verification, an approved loan amount, or other annotations as appropriate for the given implementation. The case or case folder as a process-level object may have process-level metadata properties that track these types of requests, as well as other pertinent information relating to the case (e.g., the particular loan application). The same process-level metadata properties may also be used to automatically initiate other process-level processing of the loan applicant's case. To further the present example, analysis of the annotations may be utilized to update process-level metadata properties to request the additional information and/or to automatically launch a process to obtain the additional employment history or income verification. Additionally, the updated process-level metadata may initiate a next step in the associated workflow of the loan process, such as where an approved loan amount is specified and processing to prepare closing documents for the loan may be initiated.

As another example, where a medical client information processing system that processes medical cases is utilized, an x-ray may include annotations entered by a radiologist onto an electronic or physical copy of the image, such as an arrow identifying a bone fracture, and a comment related to a severity of the bone fracture. The case or case folder as a process-level object may have process-level metadata properties that track radiological and other types of images, as well as other pertinent information relating to the case (e.g., the particular patient). The same process-level metadata properties may also be used to automatically initiate other process-level processing of the patient's case. To further the present example, analysis of the annotations may be utilized to update process-level metadata properties to indicate that the patient is to have a cast applied to immobilize the patient's fracture, and an automated notification may be generated to indicate that the patient is to be moved to an available room to have the cast applied.

Many other possible implementations of the present technology are possible. All such possible implementations are considered to be within the scope of the present technology.

It should be noted that several terms are utilized to refer to categories of elements or may be used interchangeably to assist with description of the present technology. For example, the term "annotation" refers to a hand-written or electronic notation associated with a document that represents/captures a user's inspection of and analysis of the document (e.g., factual findings or a decision). As such, the term annotation is distinct from the term process-level metadata as used herein and defined further below. It is further understood that a document annotation as described herein is analyzed to infer separate and distinct process-level metadata.

The terms "document," "process content," and similar terms as used herein may include data upon which a process operates, such as a form (e.g., web-fillable form), an image (e.g., a photographic image, x-ray, etc.), a user request object, an application object (e.g., a loan application, etc.), a portable document format (PDF) file, or other form of data or content object. As such, these terms refer to any data/content that may be associated with and operated upon as part of a process or workflow context.

The term "process-level metadata" and similar terms as utilized herein refer to formalized process-level entries that guide and inform process-level actions associated with a workflow. As such, the process-level metadata inference and mapping from document annotations, as described herein, forms a mapping of unstructured user notations entered in association with documents into formalized process-level data entries that may be used to invoke and guide process-level activities.

The terms "process-level context," "workflow context" and similar terms as used herein refer to a formalized process-level association of process content. As such, collections of documents and/or process content associated with a particular project or series of activities may be considered to share the same "context" for process-level operations. A "workflow relationship object" represents process-level context for a workflow. Examples of a process-level or workflow context, and thereby a workflow relationship object, may include a container object, such as a folder, a case, a request, client/customer information, or other form of relationship or association with which documents may be formally compartmentalized and related. A "client" or a "case" associated with a client may be considered to form a process-level context for purposes of the present description. Collections of process-level metadata may form context associated with a workflow process that identify particular process-level attributes associated with the particular process-level context (e.g., the client, case, etc.). The terms process-level context and workflow context are used interchangeably herein to refer to any such association of content objects, and may be referred to herein generally as "context" for ease of description as defined above with the understanding that any reference to one of the respective terms may be applied to any of the other respective terms as defined above and as appropriate for a given implementation.

Additionally, the terms "process-level structure," "process-level object," "workflow-processing object," are used interchangeably herein and represent a structured association or collection of process-level metadata (process-level context) about a particular categorized process/workflow activity. A "container object" may be considered a process-level folder/structure that compartmentalizes the process-level context/metadata and associates that process-level context with process content/documents. For example, a case folder in a case management system is an example of a process-level structure or container object that associates case metadata (e.g., patient name, etc.) with case documents (e.g., x-ray images, etc.) for a particular case/client. A claim folder in an insurance claims management system is another example of a process-level structure or container object that associates claim metadata (e.g., insured name, insurance limits, etc.) with claim documents (e.g., insurance claim forms, etc.) for a particular insured individual. As such, a container object is considered a structured process-level object that is instantiated and/or stored within a memory device for purposes of the present description. The terms "process-level object," "container," and "container object" may be used interchangeably herein as appropriate for a given example with the understanding that any such reference to one of the respective terms may be applied to any of the other respective terms as defined above and as appropriate for a given implementation.

Additionally, a "workflow processing system," "case processing system," "metadata context-driven processing system," and similar terms as used herein may be considered to refer systems that utilize process-level metadata/context to guide and control workflow processing. Examples of a metadata context-driven processing system include a business processing management (BPM) system, an enterprise content management (ECM) system, a work flow management system, a case management system, or any other form of system that facilitates and provides technology for processing of workflow-related activities. As such, the term metadata context-driven processing system is used herein to refer to any such technological system.

Further, as used herein, the terms "invoke" and "initiate" as used within the context of a process-level "action" and similar terms refer to initiation/launching of processing based upon an inference of and/or a change to process-level metadata from annotations. For example, invocation of a workflow action may include starting a process-level activity or step (e.g., progressing a case to the next stage of processing), initiation/launching of a work flow or portion of a workflow, and initiation/launching of a service (e.g., a call to a web-service operation with parameters based upon inferred metadata).

An example of metadata inference and invocation of web-service operations from annotations includes inferring parameters that specify the designated start time for a particular task from annotations. An example process-level initiation of web-service operations includes starting a web-based task manager service with the inferred parameters to schedule a launch and run a particular task. Another example of metadata inference and invocation of web-service operations from annotations includes inferring parameters that specify a difference/change in billing for a client (e.g., a patient of a doctor) and starting a billing web service with the inferred parameters to adjust the client billing (e.g., to create an invoice, etc.).

Invocation of a process-level action may also include operations, such as, initiation/launching of an operation (e.g., a case operation such as splitting a case, marking a case as completed, etc.), initiating updates to a search engine to recognize inferred process-level metadata to expose the inferred process-level metadata to the search facilities (e.g., expose a newly opened or closed case as a potential search result for "open cases" or "closed cases," respectively), creation of a record of a change to process-level metadata resulting from inference of the metadata from the annotation to declare the annotations or set of annotations and the inferred metadata as records, or other forms of initiation of processing within a workflow processing system.

As such, the process-level metadata inference and mapping from document annotations, as described herein, operates as a new event trigger for multiple forms of processing in association with process-level and workflow management systems. Accordingly, invocation of a process-level action is used herein to refer to initiation of any such annotation-originated inferred-metadata-based processing event.

Additionally, the inferred and updated process-level metadata may be evaluated to determine whether any other related content items (e.g., documents) in the process-level container (e.g., case, folder, etc.) have a relationship to the inferred process-level metadata. Where such a relationship is determined, the related content-level metadata values of the other related content items may be updated. As such, the present technology provides mapping from annotations on documents at the content-level up to metadata at the process-level, and the updated inferred metadata at the process-level may further be utilized to update metadata back down at the content-level in association with other content items/documents in the respective container object. Accordingly, the present technology provides a sophisticated cross-hierarchical propagation of metadata from inferred annotations on documents up to the process-level and back down to the content-level and other content items.

It should be noted that conception of the present subject matter resulted from recognition of certain limitations associated with document processing within the context of workflow processes. It was observed with respect to previous workflow processing systems that a user may annotate a document, such as an image document, with annotations that may include identifiers of portions of the document and/or written notations. For example, it was observed that a radiologist may annotate a patient x-ray document with an arrow that identifies an area of the image associated with written details that specify analysis of the x-ray, or that an insurance adjuster may annotate a vehicle photographic image with a circle that identifies an area of damage associated with written details of the vehicle inspection, or that a loan processing officer may place an asterisk on a scanned image of a loan application that identifies an area of the loan application for which written details specify additional information that is needed to complete the loan application. It was further observed that each user may enter such annotations differently from other users and that additional business-level processing may be appropriate in each situation after the user annotates the image. However, it was further observed that there is no prior technology by which to autonomously evaluate different forms of annotations of different users or by which to infer workflow process-level metadata from such an evaluation of different types of annotations. It was further observed that there was no prior technology by which to autonomously associate any such inferred workflow process-level metadata with a container or business object within a workflow process (e.g., with a case folder of the patient, or with an insurance claim of an insured motorist, or with the loan applicant case folder). It was additionally observed that there was no prior technology by which to invoke appropriate business-level processing from inferred workflow process-level metadata. From these observations, it was determined that it was desirable to provide technology by which workflow process-level metadata may be autonomously inferred from evaluation of image annotations and autonomously mapped to (associated with) containers or business objects with which the images or documents are associated. It was further determined that it was desirable to provide technology to invoke appropriate workflow process activities based upon the inferred workflow process-level metadata as mapped to the respective containers or business objects. The present subject matter improves document processing within the context of workflow processes by providing for workflow process-level metadata inference and mapping from image document annotations, as described above and in more detail below. As such, improved business-level processing may be obtained through use of the present technology.

The process-level metadata inference and mapping from document annotations described herein may be performed in real time to allow prompt inference and mapping of metadata, and workflow process invocation, from annotations entered in association with documents. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

FIG. 1 is a block diagram of an example of an implementation of a system 100 for process-level metadata inference and mapping from document annotations. A computing device_1 102 through a computing device_N 104 communicate via a network 106 with several other devices. The other devices include a workflow process server_1 108 through a workflow process server_M 110. A metadata repository 112 stores metadata for workflow processes performed by the workflow process server_1 108 through the workflow process server_M 110. A content repository 114 stores documents.

For purposes of the present description, a process-level structure or case may be established within the metadata repository 112. The process-level structure or case includes process-related metadata (alternatively "case-related metadata"), such as a process/case name, a process/case folder, identification of documents within the content repository 114 that are associated with the process/case, and other process/case related metadata. Similarly, the documents may include any form of business content, including text-based documents, image documents, and other forms of content that may be associated with a process/case.

As will be described in more detail below in association with FIG. 2 through FIG. 4B, the computing device_1 102 through the computing device_N 104 and the workflow process server_1 108 through the workflow process server_M 110 may each provide automated process-level metadata inference and mapping from document annotations. As such, the present technology may be implemented at a user computing device or server device level. A variety of possibilities exist for implementation of the present subject matter, and all such possibilities are considered within the scope of the present subject matter.

The computing device_1 102 through the computing device_N 104 may be used to view and annotate documents stored within the content repository 114 that are associated with a case established within the metadata repository 112. The process-level metadata inference and mapping from document annotations described herein operates to evaluate the document annotations and to infer metadata for the case with which the respective documents are associated. The computing device_1 102 through the computing device_N 104 or the workflow process server_1 108 through the workflow process server_M 110 may perform the inference of the workflow process metadata from the document annotations. The workflow process server_1 108 through the workflow process server_M 110 may further operate upon or in response to the inferred metadata to perform process-level operations. As such, the inference of process-level metadata from lower-level document annotations operates to invoke and automate higher-level workflow processing tasks.

It should be noted that any of the respective computing devices described in association with FIG. 1 may be portable computing devices, either by a user's ability to move the respective computing devices to different locations, or by the respective computing device's association with a portable platform, such as a plane, train, automobile, or other moving vehicle. It should also be noted that the respective computing devices may be any computing devices capable of processing information as described above and in more detail below. For example, the respective computing devices may include devices such as a personal computer (e.g., desktop, laptop, etc.) or a handheld device (e.g., cellular telephone, personal digital assistant (PDA), email device, tablet computing device, e-book reading device, etc.), a web server, an application server, or other data server device, or any other device capable of processing information as described above and in more detail below.

The network 106 may include any form of interconnection suitable for the intended purpose, including a private or public network such as an intranet or the Internet, respectively, direct inter-module interconnection, dial-up, wireless, or any other interconnection mechanism capable of interconnecting the respective devices.

The metadata repository 112 and the content repository 114 may include relational databases, object databases, or any other storage type of device. As such, the metadata repository 112 and the content repository 114 may be implemented as appropriate for a given implementation.

Figure 2:
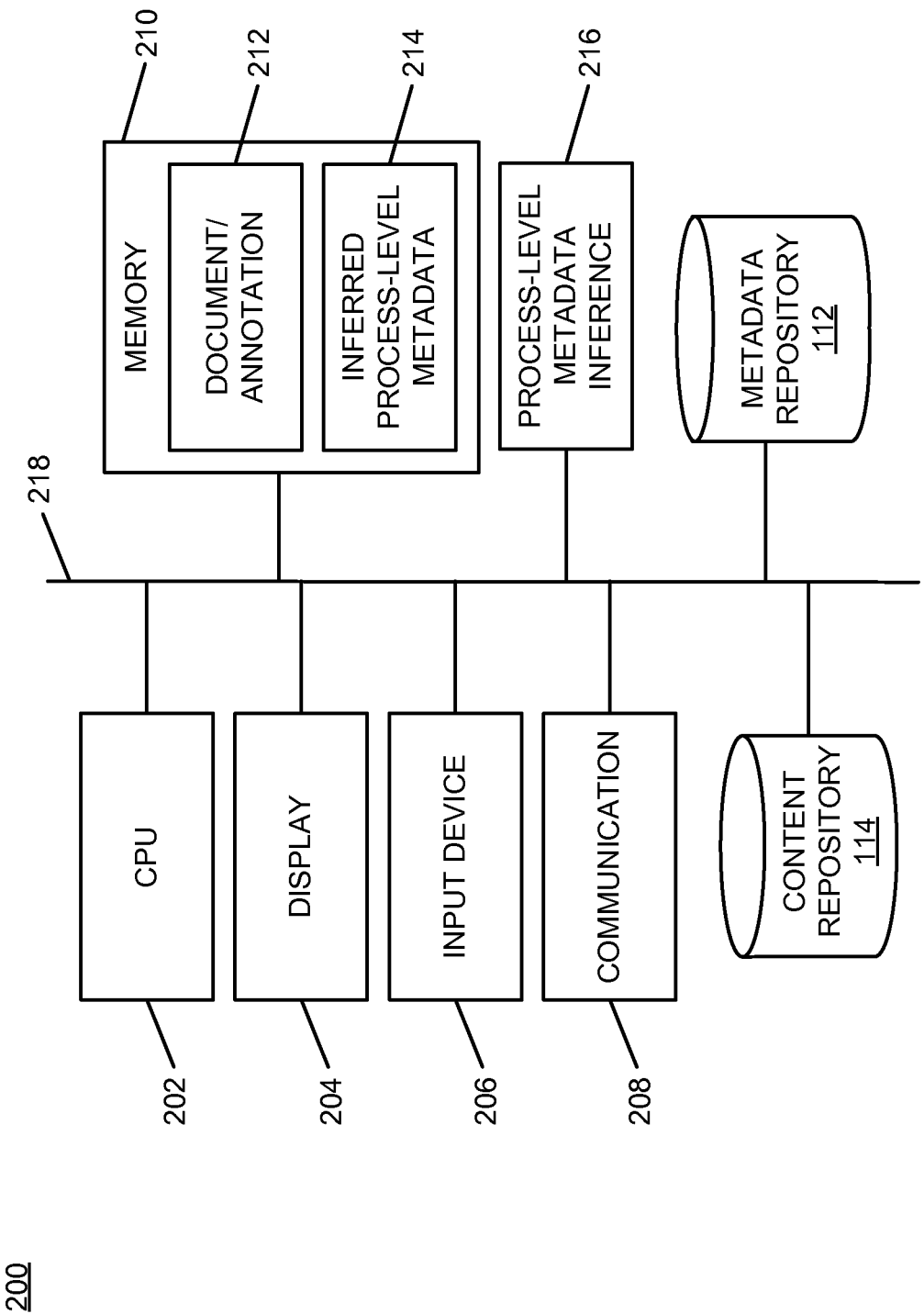
FIG. 2 is a block diagram of an example of an implementation of a core processing module capable of performing process-level metadata inference and mapping from document annotations according to an embodiment of the present subject matter.

FIG. 2 is a block diagram of an example of an implementation of a core processing module 200 capable of performing process-level metadata inference and mapping from document annotations. The core processing module 200 may be associated with either the computing_device_1 102 through the computing_device_N 104 or with the server_1 108 through the server_M 110, as appropriate for a given implementation. As such, the core processing module 200 is described generally herein, though it is understood that many variations on implementation of the components within the core processing module 200 are possible and all such variations are within the scope of the present subject matter.

Further, the core processing module 200 may provide different and complementary processing of annotations and inferred/mapped metadata in association with each implementation. As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 ("processor") provides hardware that performs computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, touchscreen, voice command processing unit, or any other type of input device by which the user may interact with and respond to information on the display 204.

It should be noted that the display 204 and the input device 206 may be optional components for the core processing module 200 for certain implementations/devices, or may be located remotely from the respective devices and hosted by another computing device that is in communication with the respective devices. Accordingly, the core processing module 200 may operate as a completely automated embedded device without direct user configurability or feedback. However, the core processing module 200 may also provide user feedback and configurability via the display 204 and the input device 206, respectively, as appropriate for a given implementation.

A communication module 208 provides hardware, protocol stack processing, and interconnection capabilities that allow the core processing module 200 to communicate with other modules within the system 100. The communication module 208 may include any electrical, protocol, and protocol conversion capabilities useable to provide interconnection capabilities, as appropriate for a given implementation.

A memory 210 includes a document/annotation storage area 212 that provides storage for documents accessed by users and provides storage for document annotations entered by users in association with documents accessed by users in association with the core processing module 200. An inferred process-level metadata storage area 214 provides processing space to infer case-level metadata from document annotations and provides storage for process-level metadata (e.g., case related or workflow related metadata) inferred from document annotations in association with the core processing module 200.

It should be understood that for a server-based implementation of the core processing module 200, the documents and annotations within the document/annotation storage area 212 may be imported either from a computing device or from the content repository 114 after the annotations are added by a user of a computer device. Alternatively, for a client-computing device-based implementation, the documents and annotations may be stored locally prior to being migrated to the content repository 114 or to one of the workflow process server_1 108 through the workflow process server_M 110. Additionally, as described above, any of the workflow process server_1 108 through the workflow process server_M 110 and the computing_device_1 102 through the computing_device_N 104 may perform the inference of process-level metadata from the document annotations.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

A process-level metadata inference module 216 is also illustrated. The process-level metadata inference module 216 provides document annotation analysis and process-level inference of metadata from analyzed annotations for the core processing module 200, as described above and in more detail below. The process-level metadata inference module 216 implements the automated process-level metadata inference and mapping from document annotations of the core processing module 200.

It should also be noted that the process-level metadata inference module 216 may form a portion of other circuitry described without departure from the scope of the present subject matter. Further, the process-level metadata inference module 216 may alternatively be implemented as an application stored within the memory 210. In such an implementation, the process-level metadata inference module 216 may include instructions executed by the CPU 202 for performing the functionality described herein. The CPU 202 may execute these instructions to provide the processing capabilities described above and in more detail below for the core processing module 200. The process-level metadata inference module 216 may form a portion of an interrupt service routine (ISR), a portion of an operating system, a portion of a browser application, or a portion of a separate application without departure from the scope of the present subject matter.

The metadata repository 112 and the content repository 114 are again shown within FIG. 2 associated with the core processing module 200. As such, the metadata repository 112 and the content repository 114 may be operatively coupled to the core processing module 200 without use of network connectivity, as appropriate for a given implementation.

The CPU 202, the display 204, the input device 206, the communication module 208, the memory 210, the process-level metadata inference module 216, the metadata repository 112, and the content repository 114 are interconnected via an interconnection 218. The interconnection 218 may include a system bus, a network, or any other interconnection capable of providing the respective components with suitable interconnection for the respective purpose.

Though the different modules illustrated within FIG. 2 are illustrated as component-level modules for ease of illustration and description purposes, it should be noted that these modules may include any hardware, programmed processor(s), and memory used to carry out the functions of the respective modules as described above and in more detail below. For example, the modules may include additional controller circuitry in the form of application specific integrated circuits (ASICs), processors, antennas, and/or discrete integrated circuits and components for performing communication and electrical control activities associated with the respective modules. Additionally, the modules may include interrupt-level, stack-level, and application-level modules as appropriate. Furthermore, the modules may include any memory components used for storage, execution, and data processing for performing processing activities associated with the respective modules. The modules may also form a portion of other circuitry described or may be combined without departure from the scope of the present subject matter.

Additionally, while the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. For a distributed arrangement, the display 204 and the input device 206 may be located at a point of sale device, kiosk, or other location, while the CPU 202 and memory 210 may be located at a local or remote server. Many other possible arrangements for components of the core processing module 200 are possible and all are considered within the scope of the present subject matter. It should also be understood that, though the metadata repository 112 and the content repository 114 are illustrated as separate components for purposes of example, the information stored within the metadata repository 112 and the content repository 114 may also/alternatively be stored within the memory 210 without departure from the scope of the present subject matter. Accordingly, the core processing module 200 may take many forms and may be associated with many platforms.

Figure 3:
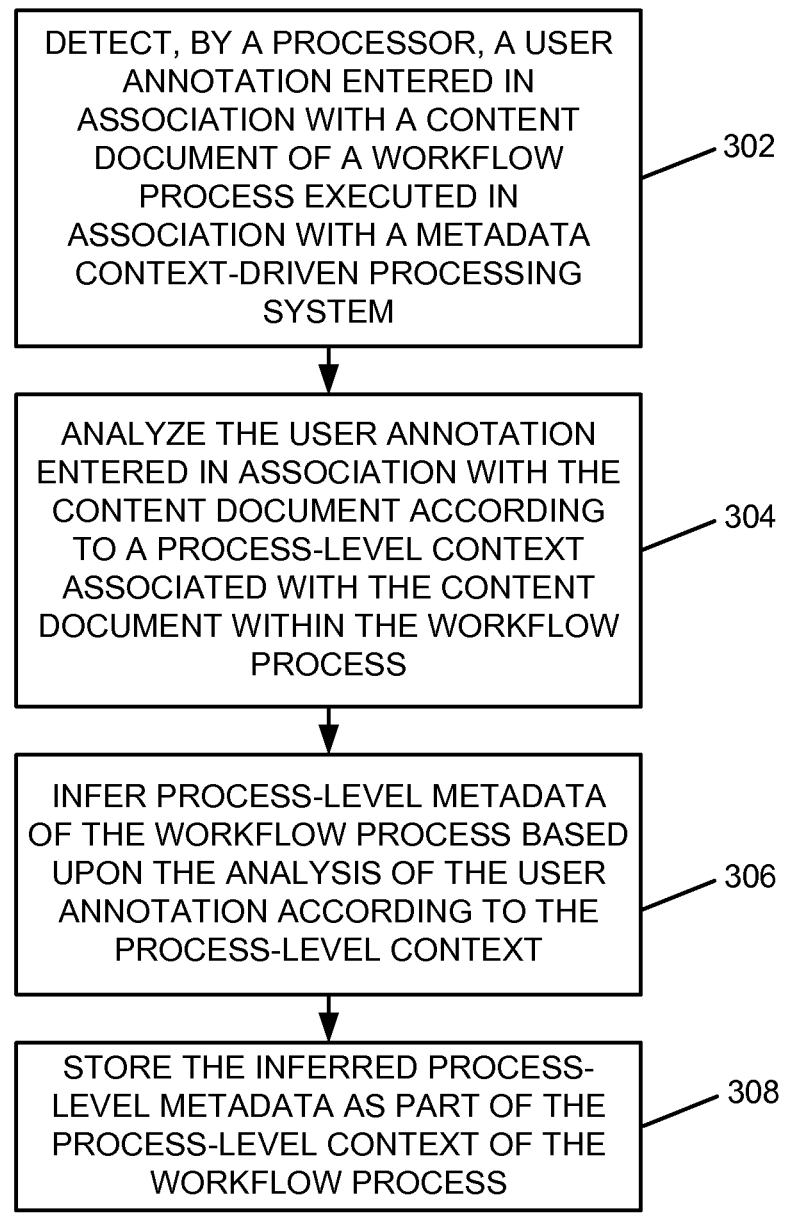
FIG. 3 is a flow chart of an example of an implementation of a process for process-level metadata inference and mapping from document annotations according to an embodiment of the present subject matter.
Figure 4A:
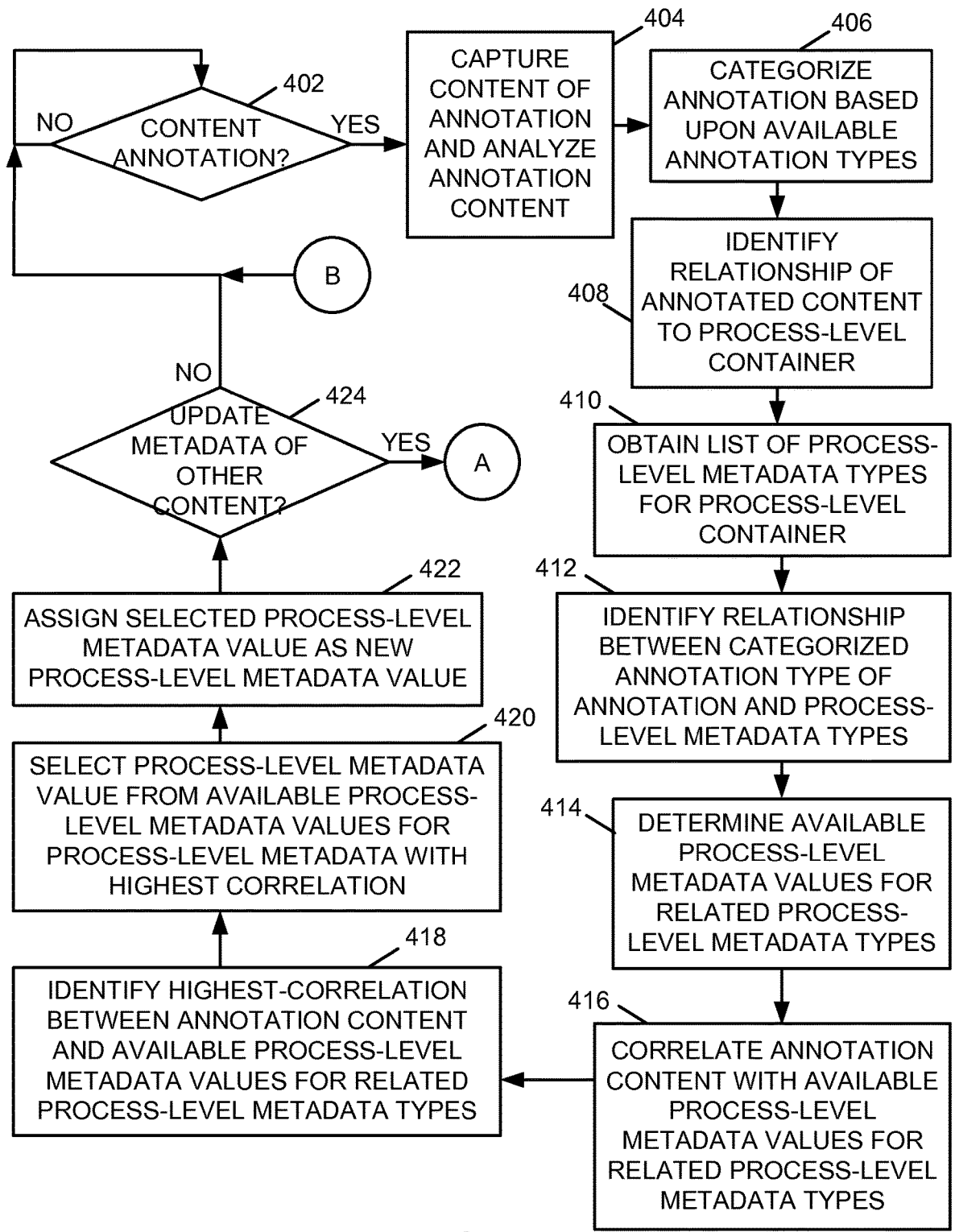
FIG. 4A is a flow chart of an example of an implementation of initial processing within a process for process-level metadata inference and mapping from document annotations by correlation of categorized annotation content and available process-level metadata values of related process-level metadata types, and mapping from inferred process-level metadata to content-level metadata of other content items according to an embodiment of the present subject matter.
Figure 4B:
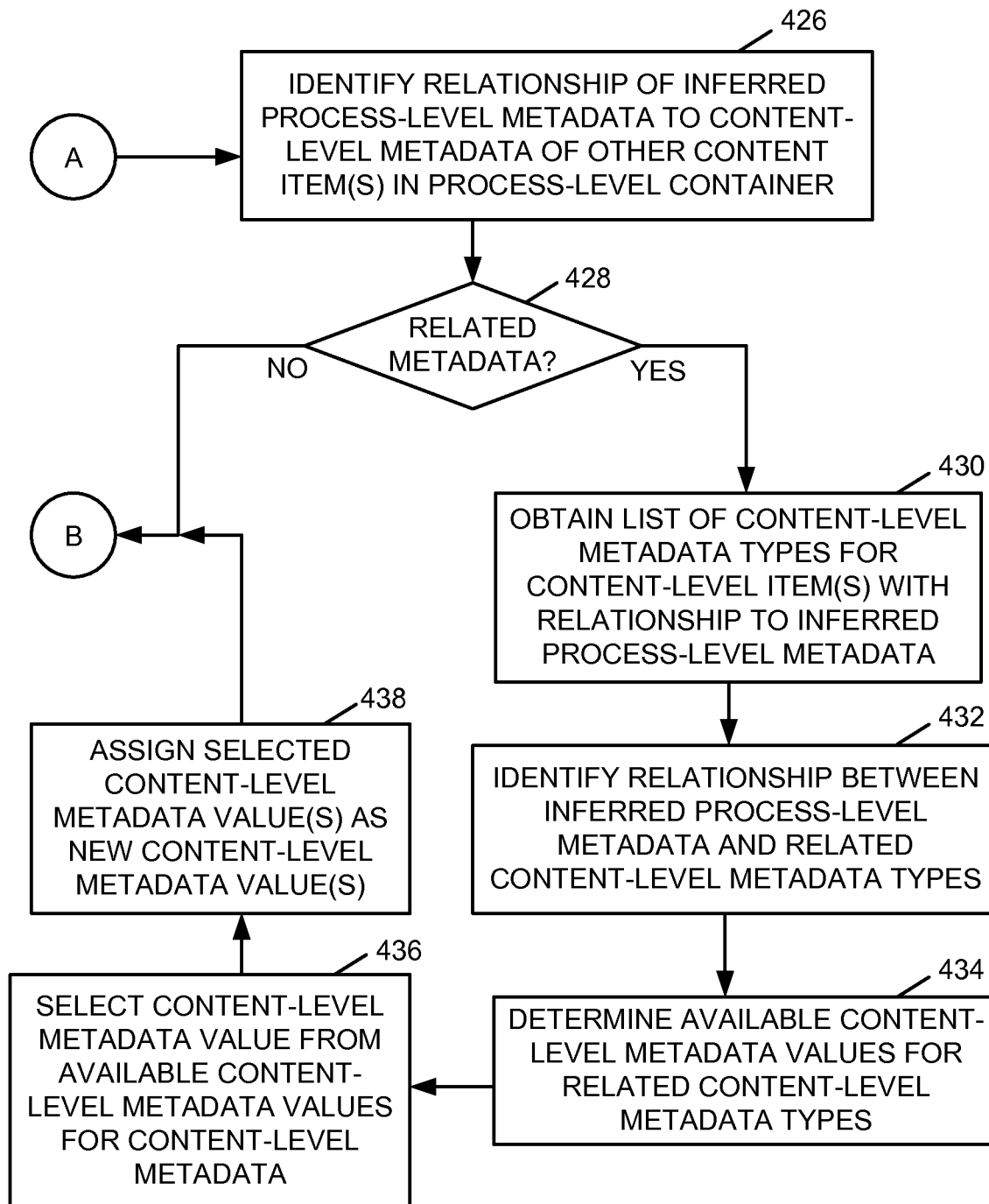
FIG. 4B is a flow chart of an example of an implementation of additional processing within a process for process-level metadata inference and mapping from document annotations by correlation of categorized annotation content and available process-level metadata values of related process-level metadata types, and mapping from inferred process-level metadata to content-level metadata of other content items according to an embodiment of the present subject matter

FIG. 3 through FIG. 4B described below represent example processes that may be executed by devices, such as the core processing module 200, to perform the automated process-level metadata inference and mapping from document annotations associated with the present subject matter. Many other variations on the example processes are possible and all are considered within the scope of the present subject matter. The example processes may be performed by modules, such as the process-level metadata inference module 216 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

FIG. 3 is a flow chart of an example of an implementation of a process 300 for process-level metadata inference and mapping from document annotations. At block 302, the process 300 detects, by a processor, a user annotation entered in association with a content document of a workflow process executed in association with a metadata context-driven processing system. At block 304, the process 300 analyzes the user annotation entered in association with the content document according to a process-level context associated with the content document within the workflow process. At block 306, the process 300 infers process-level metadata of the workflow process based upon the analysis of the user annotation according to the process-level context. At block 308, the process 300 stores the inferred process-level metadata as part of the process-level context of the workflow process.

FIGS. 4A-4B are flow charts of an example of an implementation of a process 400 for process-level metadata inference and mapping from document annotations by correlation of categorized annotation content and available process-level metadata values of related process-level metadata types, and mapping from inferred process-level metadata to content-level metadata of other content items. FIG. 4A illustrates initial processing within the process 400. At decision point 402, the process 400 makes a determination as to whether a content annotation has been detected in association with a content item of a workflow process. As described above, content items associated with a workflow process may include documents, and annotations may include hand-written or programmatically entered notations of a user's analysis of the document.

In response to determining at decision point 402 that a content annotation has been detected, the process 400 captures content of the annotation and analyzes the annotation content at block 404. Capture and analysis of the annotation content may include, for example, optical character recognition (OCR), handwriting analysis, or other form capture and analysis of the annotation content as appropriate for the given implementation.

At block 406, the process 400 categorizes the annotation based upon available annotation types. For example, annotation types may include graphical elements such as arrows, text-based annotations, or other forms of annotations as appropriate for a given implementation.

At block 408, the process 400 identifies the relationship of/between the annotated content to a process-level container that contains the content item with which the annotation was detected. For example, the relationship between annotated content and a process-level container may include identification of a type of container object with which the content item is associated.

At block 410, the process 400 obtains a list of process-level metadata types for the identified process-level container. Example metadata types may include process-level user decision fields (e.g., a radiologist's decision regarding further treatment of a patient, a loan officer's decision regarding a loan application, etc.) and other forms of metadata as appropriate for a given implementation.

At block 412, the process 400 identifies a relationship between the categorized annotation type of the annotation and the process-level metadata types. It should be understood that there may be multiple process-level metadata types that result in relationships with the categorized annotation type of the detected annotation. For example, the text-based annotation entered by a user may be determined to be related to a process-level user decision field, such as where a radiologist has entered a text notation that a patient needs to have a cast applied to a bone fracture.

At block 414, the process 400 determines available process-level metadata values for the related process-level metadata types. Continuing with the present example, an available process-level metadata value may include a process-level field that identifies a next location within a hospital to which a patient should be moved after the radiologist reviews an x-ray.

At block 416, the process 400 correlates the annotation content with available process-level metadata values of the related process-level metadata types. Again, continuing with the present example, the process 400 may correlate the radiologist's decision that the patient needs a cast with a triage room location identifier within a hospital where a cast may be applied to the bone fracture.

It should be understood, that for any given implementation, there may be multiple potential correlations between annotation content and available process-level metadata values. As such, at block 418, the process 400 identifies a highest-correlation between annotation content and available process-level metadata values for the related process-level metadata types.

At block 420, the process 400 selects the process-level metadata value from the available process-level values for the process-level metadata with the highest correlation to the detected annotation content. At block 422, the process 400 assigns the selected process-level metadata value as a new process-level metadata value for the container object with which the content item/document is associated.

At decision point 424, the process 400 makes a determination as to whether to update content-level metadata of other content within the process-level container based upon the inferred process-level metadata. In response to determining not to update content-level metadata of other content within the process-level container based upon the inferred process-level metadata, the process 400 returns to decision point 402 and iterates as described above. In response to determining at decision point 424 to update content-level metadata of other content within the process-level container based upon the inferred process-level metadata, the process 400 transitions to the processing shown and described in association with FIG. 4B.

FIG. 4B illustrates additional processing associated with the process 400 for process-level metadata inference and mapping from document annotations by correlation of categorized annotation content and available process-level metadata values of related process-level metadata types, and mapping from inferred process-level metadata to content-level metadata of other content items. At block 426, the process 400 identifies the relationship of/between the inferred-process-level metadata and content-level metadata of other content item(s) in the process-level container for which the process-level metadata was inferred. For example, the relationship between inferred process-level metadata and content-level metadata may include identification of a type of content item with which the process-level metadata is associated. It is understood that multiple content items may be determined to be related to the inferred and updated process-level metadata. As such, the processing described below applies to each identified related content item.

At decision point 428, the process 400 makes a determination as to whether any content-level metadata has a relationship to the inferred and updated process-level metadata. In response to determining that there is content-level metadata with a relationship to the inferred and updated process-level metadata, the process 400 obtains a list of content-level metadata types for the identified content-level item(s) with the determined relationship to the inferred process-level metadata at block 430. Example metadata types may include content-level user decision fields (e.g., an invoice document that is to be updated to document an x-ray, where the invoice document metadata is to be updated to indicate that the invoice is to be reviewed and signed off on by a radiology department, updating a property inspection request document in response to a loan officer's decision to approve a loan application, etc.) and other forms of metadata as appropriate for a given implementation.

At block 432, the process 400 identifies a relationship between the inferred process-level metadata and related content-level metadata types. It should be understood that there may be multiple content-level metadata types that result in relationships with the inferred process-level metadata. For example, the inferred process-level metadata may be determined to be related to a content-level user decision field in another document, such as where emergency room personnel that are on duty are to be added to a document that tracks persons available to attend to a patient.

At block 434, the process 400 determines available content-level metadata values for the related content-level metadata types. Continuing with the present example, an available content-level metadata value may include a content-level field of another related document that identifies an attending physician that applies a cast to a patient's bone fracture.

At block 436, the process 400 selects the content-level metadata value from the available content-level metadata values for the content-level metadata. At block 438, the process 400 assigns the selected content-level metadata value(s) as new content-level metadata value(s) for the related content object(s) with which the inferred and updated process-level metadata is associated.

In response to assigning the selected content-level metadata value(s) as new content-level metadata value(s) for the related content object(s) with which the inferred and updated process-level metadata is associated at block 438, or in response to determining at decision point 428 that there are no content-level metadata items that have a relationship to the inferred and updated process-level metadata, the process 400 returns to FIG. 4A at decision point 402 and iterates as described above.

It should be noted that further processing may be associated with the process 400, such as invoking process-level actions responsive to changes in individual items of process-level metadata values. For example, the process 400 may generate a notification to a nursing station to alert a nurse that the patient needs to be moved to the triage location of the hospital. This additional processing is not illustrated, but is considered to form a part of the processing associated with the process 400.

As such, the process 400 detects annotations to documents, and analyzes and categorizes the detected annotations. The process 400 identifies relationships between the annotation content and process-level container metadata types and values. The process 400 further correlates the annotation content with available process-level metadata values and selects a highest-correlated process-level metadata value to update. The process 400 assigns the selected process-level metadata value with a new process-level metadata value based upon the analysis and correlation of the annotation content with the respective container object. As such, the process 400 updates a process-level metadata value for a container object (e.g., a case or case folder) with a new process-level metadata value derived from content of the annotation. The process 400 further updates other related content items/documents within the process-level context of a workflow process that have relationships with the inferred and updated process-level metadata values. The process 400 may further invoke workflow processing based upon the assigned process-level metadata value.

As described above in association with FIG. 1 through FIG. 4B, the example systems and processes provide process-level metadata inference and mapping from document annotations. Many other variations and additional activities associated with process-level metadata inference and mapping from document annotations are possible and all are considered within the scope of the present subject matter.

Those skilled in the art will recognize, upon consideration of the above teachings, that certain of the above examples are based upon use of a programmed processor, such as the CPU 202. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art based upon the teachings herein without departing from the scope and spirit of the invention. The subject matter was described to explain the principles of the invention and the practical application, and to enable others of ordinary skill in the art to understand the invention for various embodiments with various modifications as are suited to the particular use contemplated.

What is claimed is:

1. A method, comprising:
by a processor of a metadata context-driven processing system:
detecting a user document review annotation in association with review of a content document of a workflow process executed in association with a current phase;
analyzing text of the user document review annotation according to a process-level context associated with the content document within the workflow process to identify a relationship between the text of the user document review annotation and a process-level container that contains the content document within the workflow process by identifying a type of a container object;
inferring, based upon the analysis of the text of the user document review annotation according to the process-level context, process-level metadata of the workflow process, wherein the process-level metadata comprise process-level metadata types;
invoking process-level activities using the inferred process-level metadata, wherein the process-level activities comprise one or more subsequent phases of the workflow process;
determining that the inferred process-level metadata is related to content-level metadata of at least one other content document within the process-level context of the workflow process; and
updating the related content-level metadata of the at least one other content document within the process-level context of the workflow process based upon the inferred process-level metadata.

2. The method of claim 1, further comprising by the processor of the metadata context-driven processing system:
categorizing the text of the user document review annotation based upon available annotation types.

3. The method of claim 1, further comprising by the processor of the metadata context-driven processing system:
identifying a relationship between a categorized annotation type of the text of the user document review annotation and the process-level metadata types within a list of process-level metadata types;
determining available process-level metadata values of the related process-level metadata types;
correlating the text of the user document review annotation with the available process-level metadata values of the related process-level metadata types; and
assigning a new process-level metadata value based upon the text of the user document review annotation to a highest-correlated available process-level metadata value.

4. The method of claim 1, further comprising by the processor of the metadata context-driven processing system:
identifying the process-level context as a case associated with a customer entity;
determining the process-level metadata types associated with the case; and
updating a process-level metadata value of the case with a new process-level metadata value derived from the text of the user document review annotation.

5. The method of claim 1, where the content document comprises a content entity selected from a group consisting of a form, an image, a user request, an application, a portable document format (PDF) document, and a text document.

6. The method of claim 1, where the process-level context comprises a workflow relationship object selected from a group consisting of a container, a folder, a case, and a request.

7. The method of claim 1, further comprising by the processor of the metadata context-driven processing system:
storing the inferred process-level metadata within a memory as part of the process-level context of the workflow process.

8. The method of claim 1, further comprising by the processor of the metadata context-driven processing system:
inferring parameters that specify a start time for a task from the user document review annotation; and
starting a web-based task manager service with the inferred parameters to launch the task at the start time.

* * * * *